United States Patent
Stamets

(10) Patent No.: US 11,109,575 B2
(45) Date of Patent: Sep. 7, 2021

(54) BEE FEEDER HAVING LABYRINTHINE PASSAGES

(71) Applicant: Paul Edward Stamets, Shelton, WA (US)

(72) Inventor: Paul Edward Stamets, Shelton, WA (US)

(73) Assignee: TURTLE BEAR HOLDINGS, LLC, Shelton, WA (US)

( * ) Notice: Subject to any disclaimer, the term of this patent is extended or adjusted under 35 U.S.C. 154(b) by 149 days.

(21) Appl. No.: 16/550,474

(22) Filed: Aug. 26, 2019

(65) Prior Publication Data
US 2020/0068857 A1    Mar. 5, 2020

Related U.S. Application Data

(60) Provisional application No. 62/723,502, filed on Aug. 28, 2018.

(51) Int. Cl.
*A01K 53/00*    (2006.01)
(52) U.S. Cl.
CPC .................................... *A01K 53/00* (2013.01)
(58) Field of Classification Search
CPC ..................................................... A01K 53/00
USPC .......................................................... 449/49
See application file for complete search history.

(56) References Cited

U.S. PATENT DOCUMENTS

| | | | |
|---|---|---|---|
| 784,072 A | 3/1905 | Roberts | |
| 821,246 A * | 5/1906 | Kegerreis | A01K 53/00 449/10 |
| 860,852 A * | 7/1907 | Cary | A01K 53/00 449/10 |
| 905,706 A | 12/1908 | Johnson | |
| 1,022,762 A | 4/1912 | White | |
| 1,052,324 A | 2/1913 | Dayton | |
| 1,056,266 A * | 3/1913 | Danzenbaker | A01K 53/00 449/10 |
| 1,056,783 A | 3/1913 | Enhelder | |
| 1,108,277 A * | 8/1914 | Thale | A01K 53/00 449/10 |
| 1,251,583 A | 1/1918 | Saunders | |
| 1,414,284 A * | 4/1922 | Griffith | A01K 53/00 449/9 |
| 1,426,701 A * | 8/1922 | Achenbach | A01K 53/00 449/10 |
| 1,607,659 A * | 11/1926 | Will | A01K 53/00 449/15 |

(Continued)

OTHER PUBLICATIONS

Zhang et al.; Maze Navigation by Honeybees: Learning Path Regularity; 2000; Cold Spring Harbor Laboratory Press; Learning & Memory; vol. 7; pp. 363-374. (Year: 2000).*

(Continued)

*Primary Examiner* — Marc Burgess
*Assistant Examiner* — Michael A. Fabula
(74) *Attorney, Agent, or Firm* — Michael Best & Friedrich, LLP

(57) ABSTRACT

A bee feeding apparatus having labyrinthine passages. The apparatus is useful for dispensing water, bee feeding supplements, or treatments to wild or domesticated bees. The circuitous entryway hinders or inhibits other insects such as wasps, hornets, or yellow jackets from entering the innermost regions of the feeder and accessing the bee feeding supplements.

16 Claims, 9 Drawing Sheets

(56) References Cited

U.S. PATENT DOCUMENTS

| | | | | |
|---|---|---|---|---|
| 2,001,463 | A | 5/1935 | Kehrle | |
| 2,193,741 | A * | 3/1940 | Roberts, Jr. | A01K 53/00 449/11 |
| 2,492,468 | A | 12/1949 | Durben | |
| 2,496,285 | A | 2/1950 | Goebel | |
| 2,567,871 | A | 9/1951 | Briercliffe | |
| 2,611,140 | A * | 9/1952 | Goble | A01K 53/00 449/10 |
| 3,260,236 | A * | 7/1966 | Jones | A01K 1/035 119/417 |
| 3,526,913 | A | 9/1970 | Warner | |
| 3,775,786 | A * | 12/1973 | Reinert | A01K 51/00 449/2 |
| 3,835,487 | A | 9/1974 | Grigg | |
| 3,842,457 | A | 10/1974 | Johnson | |
| 3,857,364 | A * | 12/1974 | Miller, Jr. | A01K 15/02 119/417 |
| 3,978,534 | A | 9/1976 | Mihos | |
| 4,074,378 | A * | 2/1978 | Shaparew | A01K 47/06 449/13 |
| 4,094,026 | A * | 6/1978 | Simoni | A01K 47/00 449/21 |
| 4,135,265 | A * | 1/1979 | Van de Kerkof | A01K 47/00 449/13 |
| 4,214,329 | A | 7/1980 | Kozlowicz | |
| 4,322,862 | A * | 4/1982 | Beuthling | A01K 53/00 449/48 |
| 4,333,189 | A * | 6/1982 | Mentzer | A01K 53/00 449/11 |
| 4,550,525 | A * | 11/1985 | Baker | A01M 25/004 43/131 |
| 5,269,258 | A * | 12/1993 | Brown | A01K 39/01 119/57.9 |
| 5,398,642 | A * | 3/1995 | Harwich | A01K 67/033 119/6.5 |
| 5,423,291 | A * | 6/1995 | Daugherty | A01K 39/012 119/52.2 |
| D368,336 | S * | 3/1996 | Brown | D30/121 |
| 5,628,671 | A * | 5/1997 | Stevens | A01K 67/033 449/14 |
| 6,042,453 | A | 3/2000 | Varni et al. | |
| 6,830,499 | B1 | 12/2004 | Wills | |
| 7,600,487 | B2 * | 10/2009 | Stone | A01K 39/02 119/72 |
| 8,475,227 | B2 | 7/2013 | Volby | |
| 8,893,660 | B1 * | 11/2014 | Al-Azemi | A01K 53/00 119/72 |
| 9,320,265 | B2 | 4/2016 | Anderson | |
| 9,474,776 | B2 * | 10/2016 | Stamets | A61K 36/07 |
| 9,485,968 | B2 | 11/2016 | Jackson | |
| 9,854,789 | B2 | 1/2018 | Anderson | |
| 9,894,887 | B2 | 2/2018 | Collins | |
| 9,931,316 | B2 | 4/2018 | Stamets | |
| D826,481 | S | 8/2018 | Waite | |
| 10,485,225 | B1 * | 11/2019 | Jester | A01K 53/00 |
| 10,617,100 | B1 * | 4/2020 | Larsen | B65D 25/2802 |
| 2007/0207701 | A1 | 9/2007 | Berry | A01K 47/06 449/3 |
| 2007/0218804 | A1 | 9/2007 | Allan et al. | |
| 2009/0068926 | A1 * | 3/2009 | Venglar | A01K 57/00 449/6 |
| 2009/0311942 | A1 | 12/2009 | Volby | |
| 2010/0269402 | A1 * | 10/2010 | Blazer | A01M 1/106 43/107 |
| 2012/0039976 | A1 * | 2/2012 | Stamets | A01N 25/32 424/411 |
| 2012/0070414 | A1 * | 3/2012 | Stamets | A01N 63/30 424/85.5 |
| 2013/0174474 | A1 * | 7/2013 | Blazer | A01N 53/00 43/132.1 |
| 2013/0287829 | A1 * | 10/2013 | Stamets | A01N 63/30 424/402 |
| 2014/0004770 | A1 * | 1/2014 | Nenninger | A01K 47/06 449/19 |
| 2014/0323015 | A1 * | 10/2014 | Anderson | A01K 53/00 449/11 |
| 2014/0378027 | A1 | 12/2014 | Jackson | |
| 2015/0366169 | A1 | 12/2015 | Jiang et al. | |
| 2017/0035820 | A1 * | 2/2017 | Stamets | A23K 20/10 |
| 2017/0208780 | A1 * | 7/2017 | Collins | A01K 47/06 |
| 2018/0084763 | A1 | 3/2018 | Solano | |
| 2020/0376055 | A1 * | 12/2020 | Stamets | A01N 65/00 |

OTHER PUBLICATIONS

Oteros et al.; Automatic and Online Pollen Monitoring; 2015; Int Arch Allergy Immunol 2015; vol. 167; pp. 158-166. (Year: 2015).*

Fungo 1oz Silver Coin; 2009; WorthPoint.com; <https://www.worthpoint.com/worthopedia/silver-magic-mushroom-coin-fungi-1923854460>. (Year: 2009).*

Owens; Bee maze; Apr. 19, 2018; YouTube; <https://www.youtube.com/watch?v=ICwAC3-FGus>. (Year: 2018).*

PetBees; Bee Maze Championship; Jan. 25, 2016; YouTube; <https://www.youtube.com/watch?v=rjtfXNjlnkl>. (Year: 2016).*

Stamets et al., "Extracts of Polypore Mushroom Mycelia Reduce Viruses in Honey Bees," Nature Scientific Reports 8:13936:1-6 (2018).

International Search Report and Written Opinion for Application No. PCT/US2019/048066 dated Oct. 29, 2019 (9 pages).

* cited by examiner

Base Unit (100, 200)

Cover Unit (105, 201)

BEE FEEDER HAVING LABYRINTHINE PASSAGES

CROSS REFERENCE TO RELATED APPLICATIONS

This application claims priority to U.S. Provisional Patent Application No. 62/723,502, filed on Aug. 28, 2018, which is incorporated by reference herein in its entirety.

TECHNICAL FIELD

Described herein is a bee feeding apparatus having labyrinthine passages. The apparatus is useful for dispensing water, bee feeding supplements, or treatments to wild or domesticated bees. The circuitous entryway hinders or inhibits other insects such as wasps, hornets, or yellow jackets from entering the innermost regions of the feeder and accessing the bee feeding supplements.

BACKGROUND

Bees are declining worldwide due to multiple stressors. There is an urgent need to help bees survive. Estimates of losses of domesticated bees range from 35-75% in the U.S. year to year. Domesticated bees (ex. *Apis mellifera*) are critical for agriculture, and more than 2,000,000 beehives are managed in the United States alone. The losses of these managed bees are easy to measure since hives can be routinely inspected. Unfortunately, the losses of wild bees are difficult to measure as their colonies are small, often ground based, and dispersed throughout the environment, hidden from view. Estimates are that wild bees contribute nearly 80% of the pollination services that benefit farmers and agriculture. The continued decline in bee populations, both domestic and wild, are a threat to worldwide food biosecurity. Unless counter measures are taken, the cost to society, both in terms of economic impacts and the weakening of biodiversity, are inevitable. There is an urgent need to support bees.

Many of the offsets to these stressors to bee health are difficult to scale and beyond the control of ordinary citizens. Loss of habitat, neonicotinoids, pollution, factory farming, mites, and diseases ravage bee populations. Recent research has identified that viruses, vectored by mites, or spread by virus-laden pollen, are primary drivers in the decline of bees. Of the 27 viruses currently identified in bees, the Deformed Wing Virus, the Black Queen Cell Virus, Varroa Destructor Virus are but three of the viruses that have decimated bee populations. Some entomologists have declared that all bees in the world are now cross-infected. Moreover, bees have been identified to vector plant viruses, in particular several clades of tobacco viruses, causing wilt, deformity, dieback, and interruption of plant reproductive cycles, including fruit, seed, and foliage production.

There is a need for an apparatus to dispense food and treatments to wild and domesticated bees that discourages or inhibits wasps, hornets, or yellow jackets from accessing the feeding supplement.

SUMMARY

One embodiment described herein is a labyrinthine bee feeding apparatus (LBF).

One embodiment described herein is a bee feeding apparatus comprising: a base unit comprising a receptacle defining an interior and comprising a bottom, a sidewall having a lower end in engagement with the bottom, and an open top; one or more labyrinthine passages from the receptacle interior to an exterior aperture; and a cover member positioned over the open top, that covers the receptacle and labyrinthine passages. In one aspect, the apparatus further comprises one or more feeding medium dispensaries affixed within the receptacle interior. In another aspect, the apparatus further comprises one or more feeding medium vessels that interfaces with the cover member and permits fluid communication between feeding medium contained within the feeding medium vessel and the feeding medium dispensary within the base unit. In another aspect, the one or more labyrinthine passages comprises a bottom, and sidewalls having lower ends in engagement with the bottom. In another aspect, the labyrinthine passage comprises at least 1 bend region. In another aspect, the labyrinthine passage comprises at least one about 10° to about 90° bend, at least one about 30° to about 90° bend, at least one about 45° to about 90° bend, at least one about 60° to about 90° bend, at least one about 80° to about 90° bend, or at least one about 90° bend. In another aspect, the labyrinthine passage comprises at least one about 90° bend. In another aspect, the labyrinthine passage comprises 1, 2, 3, 4, 5, or 6 about 90° bends. In another aspect, the labyrinthine passage comprises 5 about 90° bends. In another aspect, the cover member comprises one or more securing mechanisms for affixing the cover member onto the base unit. In another aspect, the cover member comprises a receptacle and an orifice leading from the exterior of the cover member into the feeding station base. In another aspect, the cover member receptacle comprises a means for securing a feeding medium vessel in fluid communication with the interior of the feeding vessel to the feeding medium dispensary within the base unit. In another aspect, the base unit further comprises one or more one-way exit apertures. In another aspect, the base unit or cover member further comprises one or more of batteries, rechargeable batteries, solar panels, wireless internet receiver and transmitters, internal and/or external video cameras, internal and/or external light sources, counter mechanisms, sonic emitting devices, fragrance emitting devices, or a combination thereof. In another aspect, the feeding medium vessel contains a bee feeding medium. In another aspect, the bee feeding medium comprises water, honey, sugar, high fructose corn syrup, bee candy, nectar, pollen, pollen patties, grease patties, bee bread, propolis, bees wax, protein supplements, or combinations thereof. In another aspect, the bee feeding medium comprises one or more mushroom mycelium extracts. In another aspect, the bee feeding medium benefits bees by: treating infections of or reducing the susceptibility to viruses, fungal pathogens, bacterial pathogens, beetles, or mites; reducing viral transmission to plants; increasing the ability to spread pollen; increasing flight time; increasing immunity; increasing brood rearing; increasing ability to reproduce; increasing ability to detoxify harmful anthropogenic substances, or a combination thereof. In another aspect, the bee feeding medium comprises: one or more mushroom mycelium extracts; one or more of water, honey, sugar, high fructose corn syrup, bee candy, nectar, pollen, pollen patties, grease patties, bee bread, propolis, bees wax, protein supplements, or combinations thereof; and an effective amount of one or more preservatives. In another aspect, the one or more mushroom mycelium extracts comprises about 1% or less by volume of one or more aqueous ethanolic extracts of the mycelium of *Ganoderma lucidum Ganoderma resinaceum*,

*Fomes fomentarius, Trametes versicolor, Fomitopsis officinalis, Ganoderma applanatum, Inonotus obliquus*, or combinations thereof.

Another embodiment is a bee feeding apparatus comprising: a base unit comprising a receptacle defining an interior and comprising a bottom, a sidewall having a lower end in engagement with the bottom, and an open top; one or more labyrinthine passages from the receptacle interior to an exterior aperture comprising a bottom, and sidewalls having lower ends in engagement with the bottom and comprising at least one about 90° bend; one or more feeding medium dispensaries affixed within the receptacle interior; a cover member positioned over the open top, that covers the receptacle and labyrinthine passages; and one or more feeding medium vessels that interfaces with the cover member and permits fluid communication between feeding medium contained within the feeding medium vessel and the feeding medium dispensary within the base unit.

Another embodiment is a method for monetizing bee visits to a labyrinthine bee feeder (LBF) by monitoring and recording bee visits and crediting a cryptocurrency based on such bee visits to the LBF. Another embodiment is a cryptocurrency based on bee visits to a labyrinthine bee feeder (LBF) or the quantity or type of pollen detected.

DESCRIPTION OF THE DRAWINGS

FIG. 8A shows an illustration of components that can be fitted within the LBF base unit. FIG. 8A shows an illustration of components that can be fitted within or on the LBF cover unit.

FIG. 9A shows a small LBF for apartments or balconies. FIG. 9B shows a medium size LBF for homeowners and gardeners. FIG. 9C shows large LBF for agricultural or commercial use (farms, orchards, parks, zoos, etc). Note that the base unit is the same for all three LBFs shown and only the feeding medium vessel changes size.

DETAILED DESCRIPTION

Figure 1:
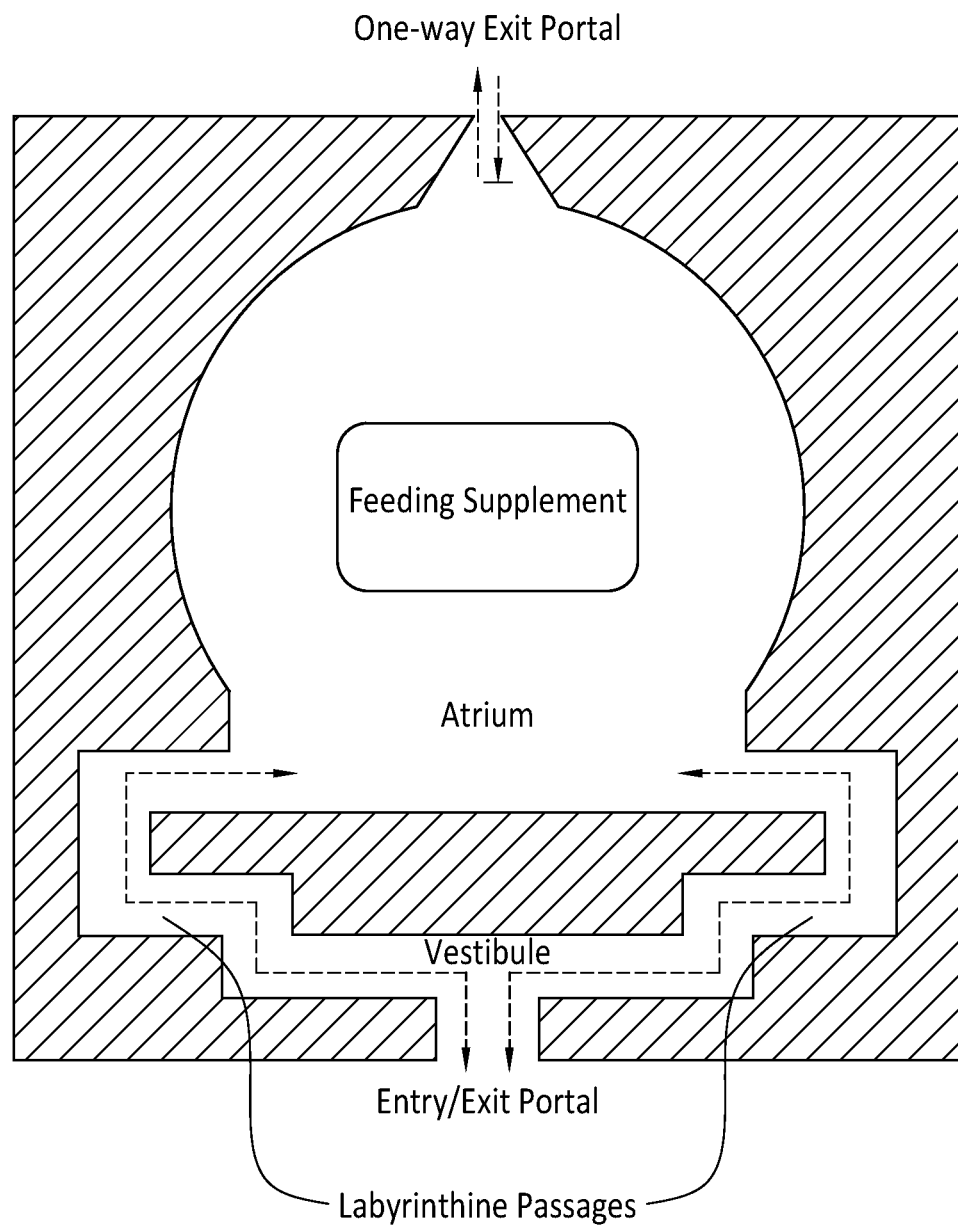
FIG. 1 illustrates an exemplary top-down schematic of the base of an LBF. Bees enter through the entry portal and may traverse the vestibule to the right or left. The then must traverse a labyrinthine passage comprising 4 additional 90° bends (paths shown by dashed lines) to reach the atrium which can contain a feeding supplement. In some aspects, the feeding station comprises an exit portal that permits bees to leave the feeding station, but prevents bees or other insects from entering the feeding stations. Bees may also re-traverse the labyrinthine passage and exit the feeder from the entry portal.

Described herein is a honeybee feeding station having a labyrinthine portal (also called a labyrinthine bee feeder or LBF). The LBF is useful for dispensing water, bee feeding supplements, or treatments to wild or domesticated bees. The circuitous or labyrinthine entryway hinders or inhibits wasps, hornets, or yellow jackets from entering the innermost regions of the feeder where food or medicinal supplements are administered. Wasps, hornets, or yellow jackets are apparently deterred by "corners" or "bends" in the passageway and are inhibited from traversing into the interior atrium of the feeder. On the other hand, honeybees readily pass around multiple bends to enter and exit the feeding station atrium.

In one embodiment, the LBF apparatus comprises a base structure or unit (100) comprising a receptacle defining an interior atrium (101) and comprising a bottom, a sidewall having a lower end in engagement with the bottom, and a top open to the environment (the exterior). FIG. 2. The base structure also comprises an entry gate (102). The entry gate forces bees entering the portal (107) to traverse the one or more labyrinthine passages (106) that leading from the portal, to the vestibule (108), to the interior atrium (101). The one or more labyrinthine passages (106) comprises a bottom, and sidewalls having lower ends in engagement with the bottom, and an open top. Upon entering the entry aperture or portal (107), there is a vestibule (108) and one or more labyrinthine passages (106) to the atrium comprising one or more "bends" or "corners" (106A). The bends (106A) in the labyrinthine passages can comprise angles from about 10° to about 90°; about 30° to about 90°; about 45° to about 90°; about 60° to about 90°; about 80° to about 90°; or about 90°. In one aspect, the one or more bends (106A) are about 90°. There can be 1-20 bends (106A) in the one or more labyrinthine passages (106). In one aspect, there are 1, 2, 3, 4, 5, 6, 7, 8, 9, 10, or even more bends (106A) in the labyrinthine passage (106). In one aspect, there are four 90° bends (106A) in the labyrinthine passage (106) from the vestibule (108) to the atrium (101). In another aspect, a bend (106A) must be made upon entering the portal (107) to traverse the vestibule (108), and thus there are five 90° bends (106A) required to traverse from the portal aperture to the atrium.

Figure 2A:
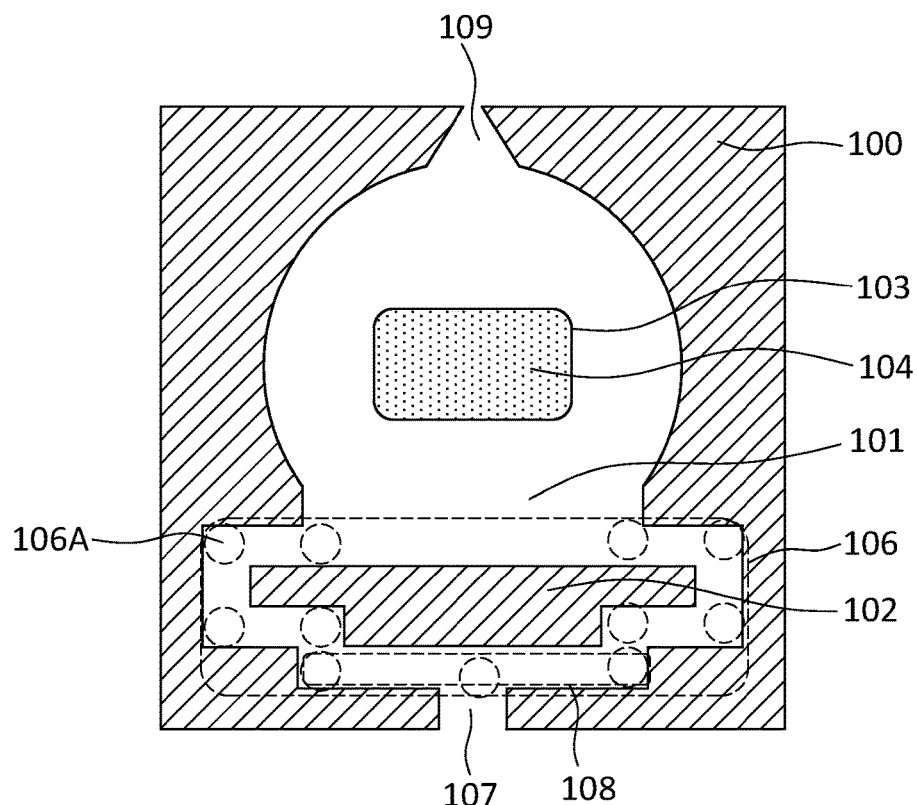
FIG. 2A illustrates an exemplary top-down schematic of the base of an LBF.
Figure 2B:
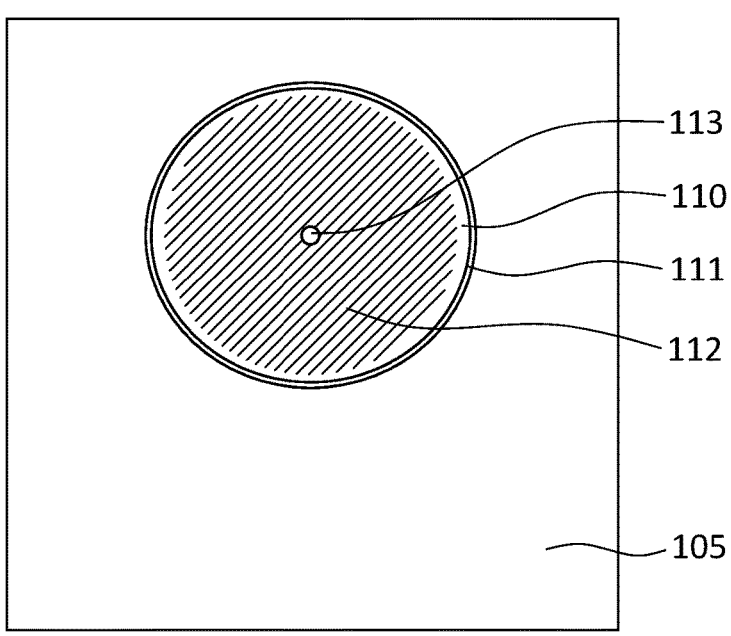
FIG. 2B illustrates an exemplary top to the base of the feeding station with a receptacle for a feeding medium vessel.

The base structure can comprise a feeding medium dispensary (103) within the atrium that contains a bee feeding medium (104). FIG. 2A. In some embodiments, the bee feeding medium is a syrup or solution. The feeding station also comprises a cover member (105) positioned over the open top, that closes the receptacle. FIG. 2B. The cover member (105) can comprise one or more locking mechanisms (118) to secure the cover to the base unit. The feeding medium dispensary (103) within the atrium can be in fluid communication with a feeding medium vessel (114) through the cover member (105).

The LBF base unit or structure (100) can also comprise one or more one-way exit ports (109) leading from the atrium (101) to the exterior. FIG. 2A. The one-way exit port (109) permits bees to leave the feeder atrium without having to traverse the one or more labyrinthine passages. The one-way exit port permits bees to exit the feeder but inhibits bees, wasps, yellow jackets, hornets, flying ants, beetles, or other insects from entering the feeder. The one-way port (109) may have a cone shaped aperture, bristles, or brushes, flappers, gates, or other means for permitting one-way passage out of the feeder. In one aspect, the exit port is open, transparent, or translucent, and permits bees in the atrium to view the exterior and thus serves to demarcate the one-way exit.

Figure 2C:
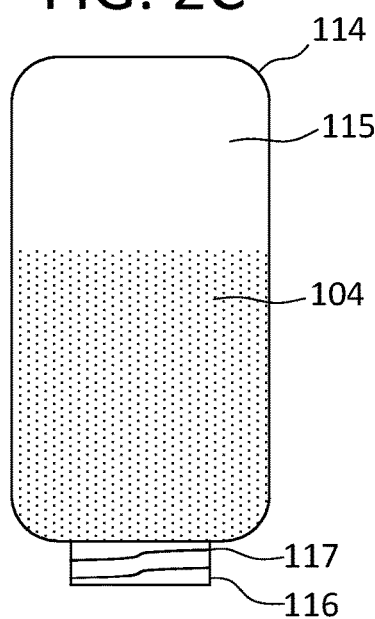
FIG. 2C illustrates an exemplary feeding medium vessel. The exemplary numbered components are discussed further in the detailed description.
Figure 3:
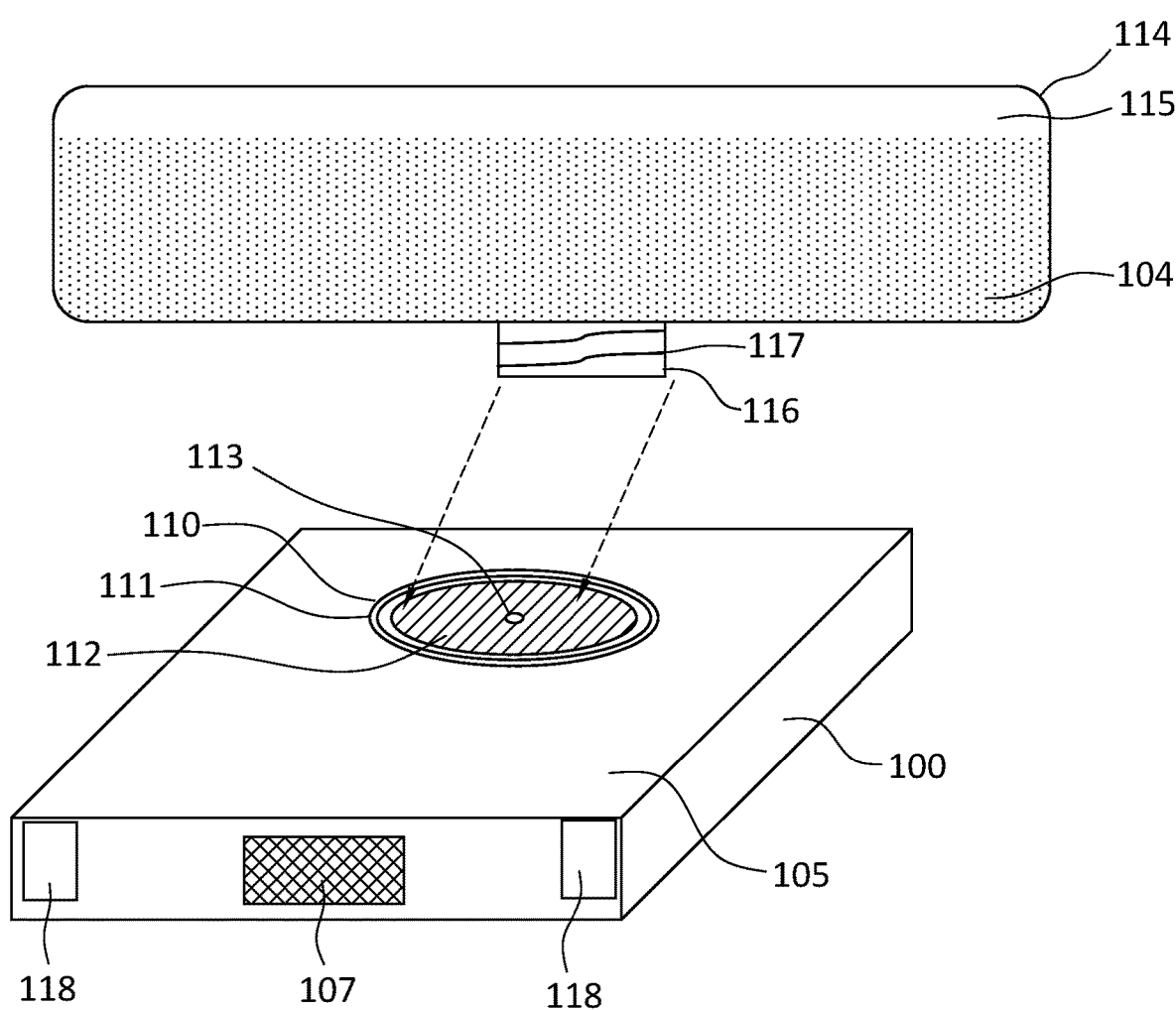
FIG. 3 illustrates an exemplary LBF schematic from a different perspective with another embodiment of the feeding medium vessel. The base and interlocked top are shown with an exemplary feeding medium vessel and the engagement of the top with the vessel are indicated.

The cover member (105) covers the base unit including the interior atrium (101), the vestibule (109), and the one or more labyrinthine passages comprising bends (106, 106A). FIG. 2A-B, FIG. 3. The exterior top of the cover member (105) also can comprise a receptacle (110) for interfacing with a feeding medium vessel (114). FIG. 3. In one aspect, the receptacle is an orifice (113) leading from the exterior of the cover member into the feeding station base when the cover member and base are interfaced. The receptacle (110) can be threaded (111) or have a push-lock configuration. FIG. 2C; FIG. 3. The receptacle can be open or comprise a floor. If the receptacle comprises a floor, the floor may further comprise a gasket or seal (112) and one or more orifices (113) for fluid communication of the feeding medium within the feeding medium vessel and the feeding medium dispensary (103) in the base of the feeding unit. The gasket or seal can comprise any suitable material such as rubber, soft plastic, polytetrafluoroethylene (PTFE, e.g., Teflon™), polyethylene terephthalate (PET, e.g., Mylar®), cork, paper, coated paper, or the like. In one aspect, the cover member comprises one or more securing mechanisms (118) such as snap locks, dovetails, hinges, or the like that secure the cover member (105) and feeding station base (100) together.

Both the feeding station base and cover member may be constructed from any suitable material including plastic, acrylic, wood, metal, composite, concrete, stone, glass, mycelium based constructed panels, or other material. The feeding station base and cover member may be, clear, transparent, translucent, colored, or opaque.

In one aspect, the feeding medium vessel (114) comprises an enclosed container having an exterior and interior (115) and a male mouth that is capable of interfacing with the receptacle (110) in the cover member (105) through threads (117) located on the mouth (116) or a push lock. FIG. 2C; FIG. 3. The feeding medium vessel can comprise any shape or size. In one aspect, the feeding medium vessel can comprise a glass receptacle such as a Mason jar. In another aspect, the feeding medium vessel comprises an enclosed plastic globe or spheroid that may be spherical or flattened. The feeding medium vessel can be made of any suitable material including glass, plastic, acrylic, metal, or the like. In one aspect, the feeding medium vessel is glass or plastic. The feeding medium vessel can be clear, transparent, translucent, colored, or opaque.

Figure 6A:
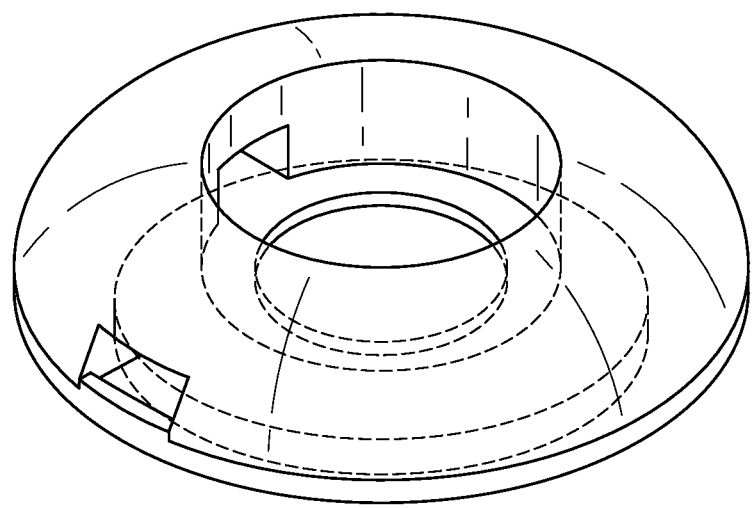
FIG. 6A shows an exemplary LBF from an angled top down perspective.
Figure 6B:
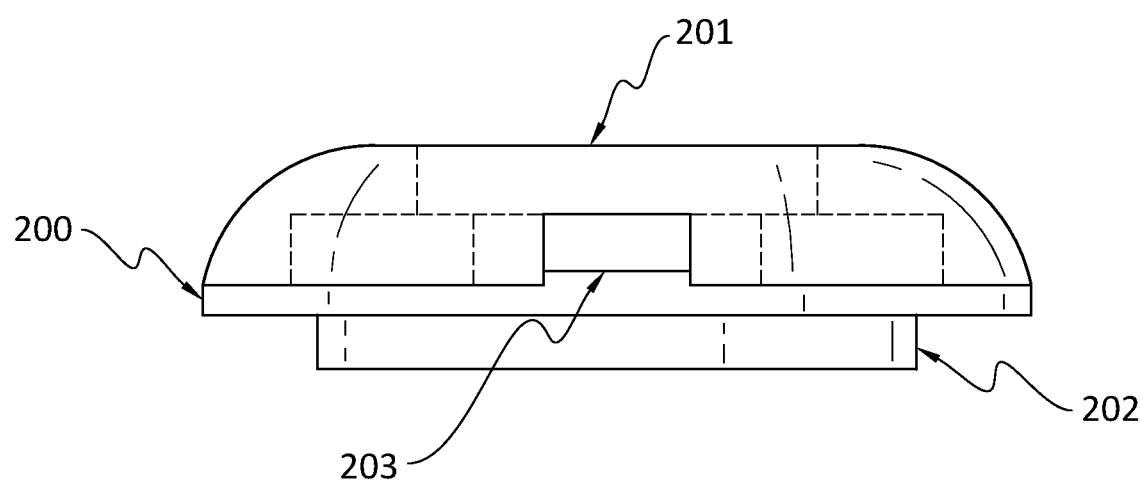
FIG. 6B shows a side view.
Figure 7A:
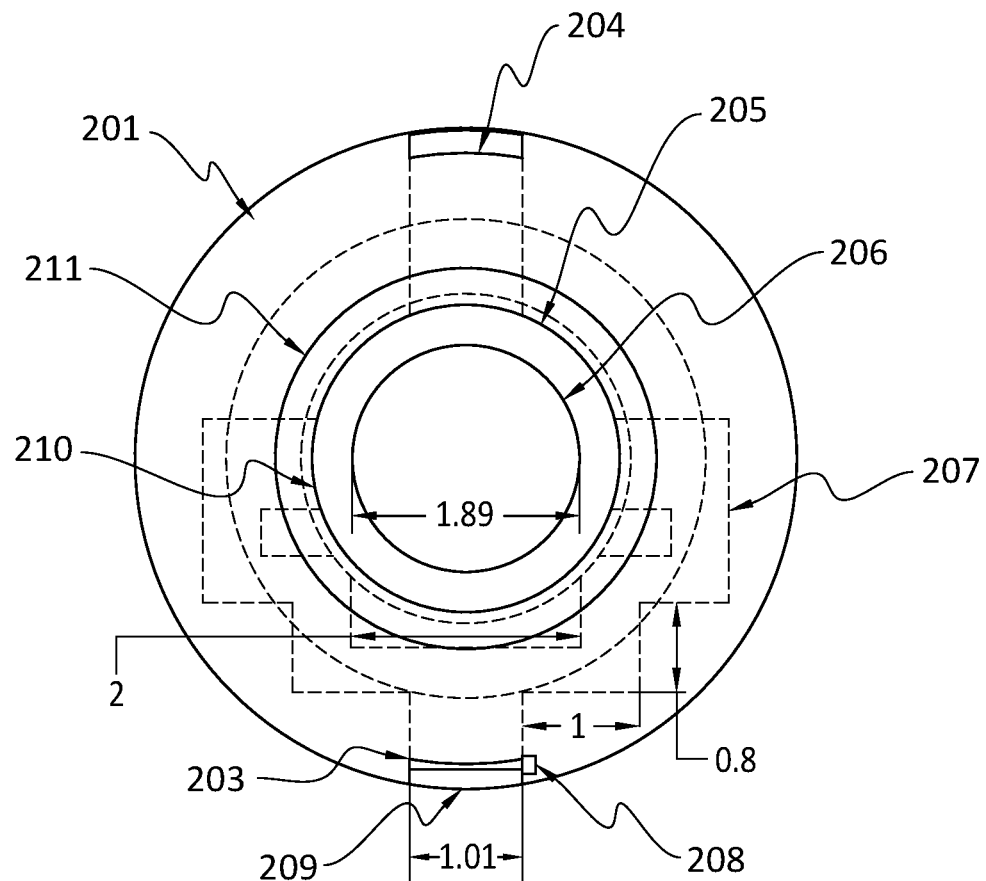
FIG. 7A shows an exemplary LBF from a top-down perspective.

Another embodiment described herein is any of the LBFs as shown in FIG. 6-8. In this embodiment, the LBF comprises a base unit (200) and a cover member (201) comprising a hemispherical donut shape with a central receptacle for receiving the male mouth of a feeding medium vessel, such as a Mason jar (FIG. 6A). When viewed from the side, the base unit and cover together resemble a squat mushroom having a head (the base unit 200, and cover member, 201) and a stipe, or stand (202) and an entry portal (203). The entry portal can comprise a lip or landing pad for bees to land on and transition into the vestibule. The top-down schematic shown in FIG. 7A shows the cover member (201) and a removable observation port (204) that can also serve as a one-way exit port (not shown). The inner most ring of the central receptacle contains an inner wall (206) rising from the floor of the base unit to the threaded feeding medium vessel mount (205). A gasket can be present on the floor of the feeding medium vessel mount (205). The dashed line (207) inscribes the one or more labyrinthine passages having at least one 90° bend leading from the entry portal (209) to the interior atrium. The layout of the labyrinthine passages is similar to the previous embodiment described above. The one or more labyrinthine passages (207) comprises a bottom, and sidewalls having lower ends in engagement with the bottom. The labyrinthine passages can be enclosed on the top or covered by a cover member of the base unit.

The entry portal (203) can comprises one or more sensors (209) such as motion detectors, video cameras, light beams, pollen sensors (208) or the like for monitoring and quantitating the number of bees entering and exiting the LBF.

The surface of the cover unit can comprise a solar cell array (210-211) that can be used to power onboard electronics and batteries.

Figure 7B:
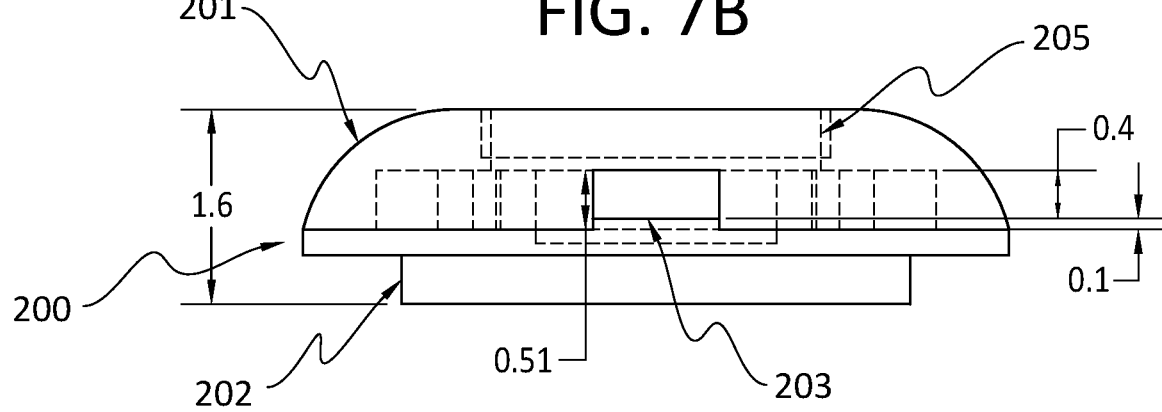
FIG. 7B shows a side view. The exemplary numbered components are discussed further in the detailed description.

The side view in FIG. 7B shows the threaded feeding medium vessel mount (205), the entry portal (203) and the base unit stand or stipe (202).

In some embodiments, the LBF can be fitted with batteries or rechargeable batteries, solar panels, wireless internet receiver/transmitters, internal and external video cameras, internal and external light sources (LEDs), a counter mechanism on the entry portal, sonic emitting devices for attracting bees or deterring pests, or fragrance emitting devices for attracting bees or deterring pests.

Figure 8A:
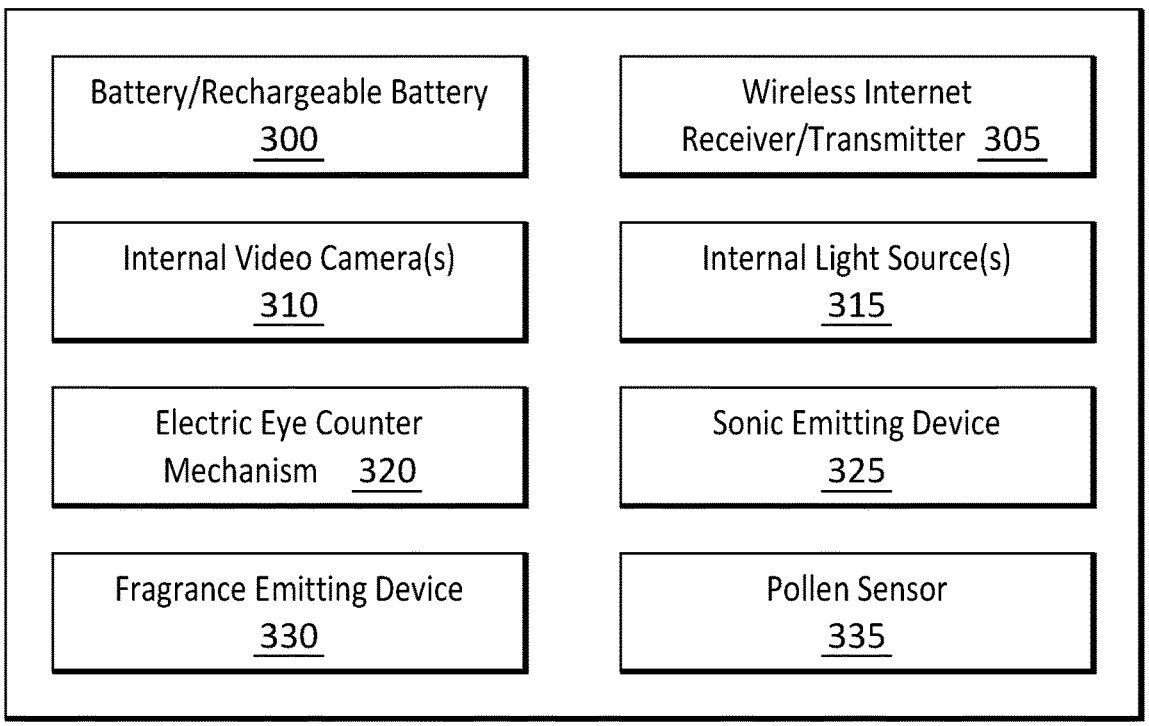
FIG. 8A-B show diagrams illustrating exemplary components that can be utilized with the LBF.
Figure 8B:
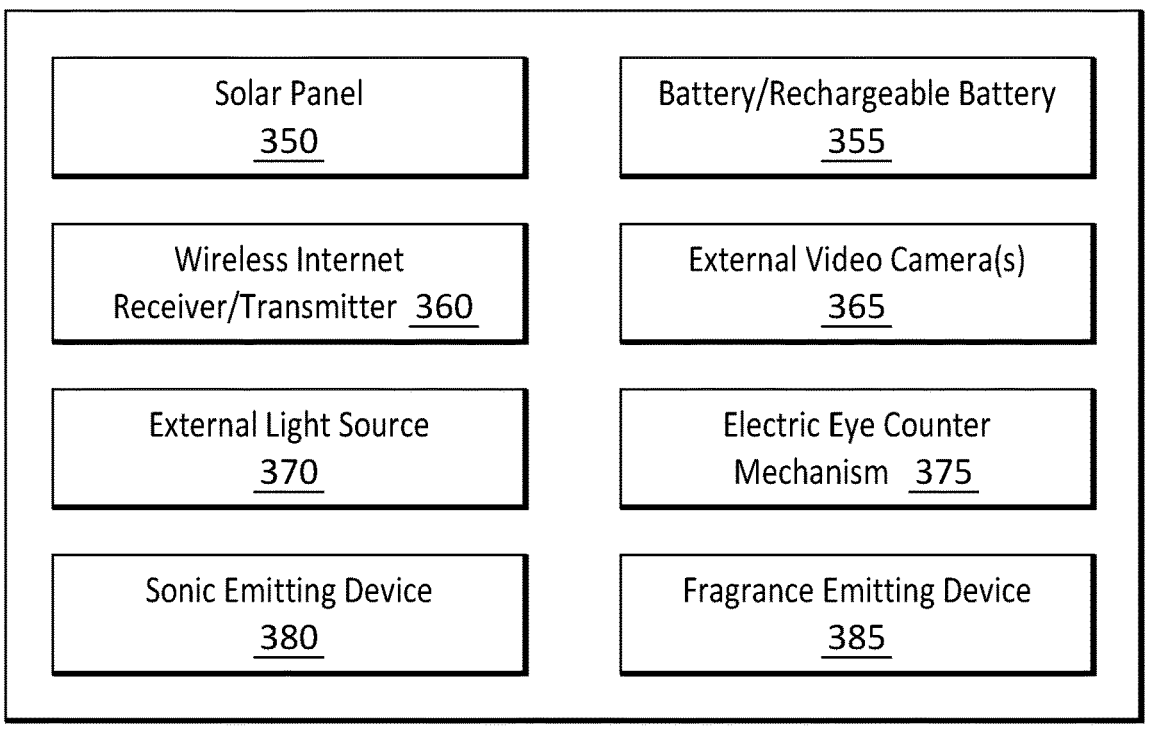
Figure 9A:
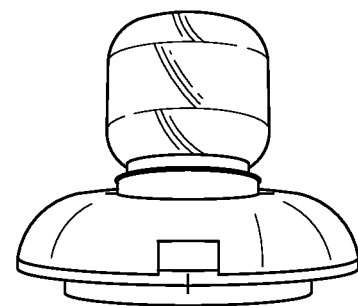
FIG. 9A-C shows renderings of three exemplary LBFs.
Figure 9B:
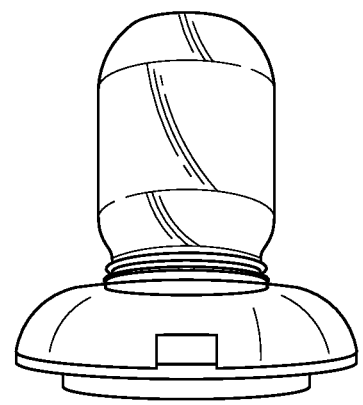
Figure 9C:
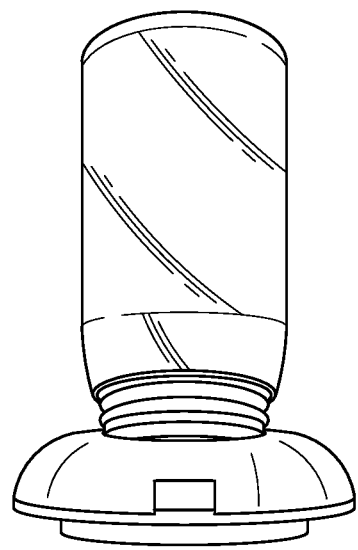

In one aspect as shown in FIG. 8A, the base unit 100, 200 can comprise batteries or rechargeable batteries 300, wireless internet receivers or transmitters 305, internal video cameras 310, internal light sources (LEDs) 315, electric eye counter mechanisms 320, sonic emitting devices 325, fragrance emitting devices 330, or pollen sensors 335. In another aspect, as shown in FIG. 8B, the cover unit 105, 201 can comprise solar panels 350, batteries or rechargeable batteries 355, wireless internet receivers or transmitters 360, external video cameras 365, external light sources (LEDs) 370, electric eye counter mechanisms 375, sonic emitting devices 380, or fragrance emitting devices 330.

Multiple LBFs can be networked together to create communities of stations which can be used to monitor bee activity and pollination services. Users can link computers or smart phones to the feeding stations through wireless networks and watch bees entering and exiting the stations or monitor bee activity on units with counting or video capabilities. Further, social media networks linking multiple feeding stations can be used by citizen scientists, researchers, city planners, industries, agriculturalists, or farmers for tracking been populations or streaming live feeds of particular units.

The LBF can comprise LED lights emitting 320-400 nm wavelengths to attract bees. This blue light can also be used illuminate the atrium and the bee feeding medium vessel. This will be aesthetically attractive because the ~400 nm light will be a deep cobalt blue color and visible to both bees and humans.

In another aspect, the LBF and bee feeding medium can be become part of a subscription service where the bee feeding medium is periodically resupplied to the end user on a weekly or monthly basis.

The LBFs described herein can be used to monitor bee populations in a particular ecosystem, such as a farm or crop plot. Each time a bee visits the feeding station, the visit can be monitored, recorded, and potentially monetized into "credits" that are fungible as currencies or cryptocurrencies. Each bee visit is a metric showing ecological and economic benefit to the surrounding ecosystem. The LBF credits can be a form of transferable currency and utilize all the benefits of the current stock and trade, carbon credit markets, cryptocurrencies, or other financial instruments.

A bee can potentially visit and pollinate an estimated 1000 flowers a day. For instance, every flower-derived product (such as fruits, nuts, and other crops) was typically pollinated by a bee. Due to stressors such as colony collapse disorder, the average flight time for bees (which correlates to the time available for pollination) has diminished from the typical 9 days to 4 days or less. This results in a bee's pollination services dropping from ca. 9000 to 4000 flowers. Given this metric, then the quantity of produce produced by pollination (almond nuts, for example), has been reduced by 5000 units, all other factors being equal.

Research by the inventor has shown that bee life span is nearly doubled from consuming the mycelium based extracts of several polypore mushrooms, and reduces colony-collapsing viruses by thousands of times with a single treatment, placing these antiviral extracts within the bee feeding station can have a dramatically positive impact on extending the bee pollination services of bees, returning their flight times to near normal baselines. Unpublished experiments and Stamets et al., "Extracts of Polypore Mushroom Mycelia Reduce Viruses in Honey Bees" *Nature Scientific Reports* 8: 13936: 1-6 (2018).

The LBFs described herein offer an unusual but demonstrably effective vehicle for monetizing pollination services. Using trip-metering technologies, such as cameras or motion detectors, each bee visiting the LBF and consuming the antiviral and immune enhancing consumables comprising mycelium based antiviral extracts can be accounted. The bees having consumed the feeding medium with mycelium based antiviral extracts will live nearly twice as long and therefore pollinate approximately twice more flowers, directly doubling crop yield.

As an example, if 5000 additional almond nuts are produced because of the feeding stations described herein, each nut has a measurable value. According to industry sources (e.g., almonds.com), the price range for almonds to growers is $0.90-$2.10/lb. The yields expected are 1400-2600 lbs per acre. See Agricultural & Resource Economics, University of California, Davis, (coststudies.ucdavis.edu). The average almond weighs 1.2 grams. Therefore, a pound of almonds, which is equal to approximately 454 grams, comprises approximately 378 almonds. Hence, assuming the value of almonds to almond grower to have a low average of $1.00/lb, each almond is worth at least $0.0026 each.

At $0.0026 each, each immune enhanced bee, succeeds in pollinating 5000 more almond flowers a day, compared to current averages, yielding one almond per pollination visit, increases the value of the yield by $13. As shown herein, more than 7 bees visit the feeding station in less than one minute, it is reasonable assumption, indeed an underestimation, that more than 1000 bees will visit the feeding station per day, especially in an agricultural setting such as commercial almond orchards. By extending the bees lifespans by 5 days, an additional 5000 bee visits to flowers is realized.

The LBFs described herein have the ability to monetize a cryptocurrency tied to a realizable and tangible benefit to farmers, wholesalers, manufacturers, or consumers. Even if the markets discount the value of almonds from $0.0026 per almond to $0.0010, each feeding station could have the metric of 5000 more flowers pollinated×1000 bees in 9-10 days (compared to 4-5 days)×$0.0010/almonds yields an extra $5,000 in value from the life extension and resulting pollination benefits of the LBF using the aforementioned metrics. Of course, this is an optimized estimation. Regardless of the mathematical assumptions, the benefits to farmers and agriculture are highly significant. Nevertheless, applying value-reducing co-efficient variables, the net result is highly significant economically and ecologically. Another embodiment described herein is a new cryptocurrency (i.e., the 'Fungo' cryptocurrency). The new Fungo cryptocurrency has tremendous value, despite heavy discounting of the aforementioned assumptions. Moreover, farmers, having stronger bees from both hives and wild bees, can substantially reduce the costs of having to import beehives, costing an average of nearly $125-$200 per hive, with two hives per acre currently being used. Moreover, stronger bees can fend off parasites like mites, lessening the need to use chemical or other pesticide treatments. Additional benefits are in, for instance, the antiviral extracts reducing tobacco viruses vectored by bees to other crops. This substantial consideration can be elaborated by agro-economists as this subject is more thoroughly explored.

Another embodiment described herein is a method for monetizing bee visits to an LBF by monitoring and recording bee visits and crediting a fungo cryptocurrency based on such bee visits to the LBF. The LBF can measure not only the number of visits, but also the quantity and/or type(s) of pollen the bees are spreading. Another embodiment described herein is a cryptocurrency based on bee visits to a labyrinthine bee feeder (LBF) or the quantity or type of pollen detected upon a visit to an LBF.

The LBFs may be hung from trees, mounted on posts, placed on windowsills, balconies, decks, patios, or positioned in any area that is likely to be frequented by bees such as gardens, crop fields, orchards, or similar sites.

Another embodiment described herein is a bee feeding apparatus comprising: a base unit comprising a receptacle defining an interior and comprising a bottom, a sidewall having a lower end in engagement with the bottom, and an open top; one or more labyrinthine passages from the receptacle interior to an exterior aperture; and a cover member positioned over the open top, that covers the receptacle and labyrinthine passages. In one aspect, the apparatus further comprises one or more feeding medium dispensaries affixed within the receptacle interior. In another aspect, the apparatus further comprises one or more feeding medium vessels that interfaces with the cover member and permits fluid communication between feeding medium contained within the feeding medium vessel and the feeding medium dispensary within the base unit. In another aspect, the one or more labyrinthine passages comprises a bottom, and sidewalls having lower ends in engagement with the bottom. In another aspect, the labyrinthine passage comprises at least 1 bend region. In another aspect, the labyrinthine passage comprises at least one about 10° to about 90° bend, at least one about 30° to about 90° bend, at least one about 45° to about 90° bend, at least one about 60° to about 90° bend, at least one about 80° to about 90° bend, or at least one about 90° bend. In another aspect, the labyrinthine passage comprises at least one about 90° bend. In another aspect, the labyrinthine passage comprises 1, 2, 3, 4, 5, or 6 about 90° bends. In another aspect, the labyrinthine passage comprises 5 about 90° bends. In another aspect, the cover member comprises one or more securing mechanisms for affixing the cover member onto the base unit. In another aspect, the cover member comprises a receptacle and an orifice leading from the exterior of the cover member into the feeding station base. In another aspect, the cover member receptacle comprises a means for securing a feeding medium vessel in fluid communication with the interior of the feeding vessel to the feeding medium dispensary within the base unit. In another aspect, the base unit further comprises one or more one-way exit apertures. In another aspect, the base unit or cover member further comprises one or more of batteries, rechargeable batteries, solar panels, wireless internet receiver and transmitters, internal and/or external video cameras, internal and/or external light sources, counter mechanisms, sonic emitting devices, fragrance emitting devices, or a combination thereof. In another aspect, the feeding medium vessel contains a bee feeding medium. In another aspect, the bee feeding medium comprises water, honey, sugar, high fructose corn syrup, bee candy, nectar, pollen, pollen patties, grease patties, bee bread, propolis, bees wax, protein supplements, or combinations thereof. In another aspect, the bee feeding medium comprises one or more mushroom mycelium extracts. In another aspect, the bee feeding medium benefits bees by: treating infections of or reducing the susceptibility to viruses, fungal pathogens, bacterial pathogens, beetles, or mites; reducing viral transmission to plants; increasing the ability to spread pollen; increasing flight time; increasing immunity; increasing brood rearing; increasing ability to reproduce; increasing ability to detoxify harmful anthropogenic substances, or a combination thereof. In another aspect, the bee feeding medium comprises: one or more mushroom mycelium extracts; one or more of water, honey, sugar, high fructose corn syrup, bee candy, nectar, pollen, pollen patties, grease patties, bee bread, propolis, bees wax, protein supplements, or combinations thereof; and an effective amount of one or more preservatives. In another aspect, the one or more mushroom mycelium extracts comprises about 1% or less by volume of one or more aqueous ethanolic extracts of the mycelium of *Ganoderma lucidum Ganoderma resinaceum, Fomes fomentarius, Trametes versicolor, Fomitopsis officinalis, Ganoderma applanatum, Inonotus obliquus*, or combinations thereof. In another aspect, the one or more mushroom mycelium extracts comprises about 0.05%, about 0.1%, about 0.5%, about 1%, about 2%, about 5%, or about 10% by volume of one or more extracts of the mycelium of one or more of: *Abortiporus biennis, Albatrellus* (genus), *Albatrellus caeruleoporus, Albatrellus confluens, Albatrellus cristatus, Albatrellus ovinus, Albatrellus pes-caprae, Bjerkandera adusta, Bondarzewia berkeleyi, Cerrena unicolor, Coltricia cinnamomea, Coltricia montagnei, Coriolopsis gallica, Cryptoporus volvatus, Daedalea quercina, Daedaleopsis confragosa, Fistulina radicata, Fomes fomentarius, Fomitopsis cajanderi, Fomitopsis officinalis, Fomitopsis pinicola, Fomitopsis rosea, Fomitopsis spraguei, Ganoderma applanatum, Ganoderma lingzhi, Ganoderma lucidum, Ganoderma sichuanense, Ganoderma tsugae, Gloeophyllum odoratum, Gloeophyllum sepiarium, Gloeoporus dichrous, Grifola frondosa, Hapalopilus nidulans, Heterobasidion annosum, Inonotus dryadeus, Inonotus obliquus, Inonotus quercustris, Inonotus radiatus, Irpex lacteus, Ischnoderma resinosum, Laetiporus cincinnatus, Laetiporus sulphureus, Lenzites betulina, Meripilus sumstinei, Neofavolus alveolaris, Nigroporus vinosus, Perenniporia fraxinophila, Perenniporia ohiensis, Perenniporia robiniophila, Phaeolus schweinitzii, Phellinus everhartii, Phellinus gilvus, Phellinus robiniae, Phellinus tremulae, Phlebia incarnata, Piptoporus betulinus, Polyporus arcularius, Polyporus badius, Polyporus brumalis, Polyorus elegans, Polyporus radicatus, Polyporus squamosus, Polyporus umbellatus, Polyporus varius, Porio cocos, Porodaedalea pini, Poronidulus conchifer, Pseudofistulina radicata, Pycnoporellus alboluteus, Pycnoporellus fulgens, Pycnoporus cinnabarinus, Schizophyllum commune, Sparassis crispa, Sparassis radicata, Spongipellis pachyodon, Spongipellis unicolor, Sparassis spathulata, Trametes elegans, Trametes hirsuta, Trametes pubescens, Trametes versicolor, Trametes villosa, Trichaptum abietinum, Trichaptum biforme, Trichaptum sector, Tyromyces chioneus, Tyromyces fumidiceps, Woffiporia extensa*, or combinations thereof.

Another embodiment is a bee feeding apparatus comprising: a base unit comprising a receptacle defining an interior and comprising a bottom, a sidewall having a lower end in engagement with the bottom, and an open top; one or more labyrinthine passages from the receptacle interior to an exterior aperture comprising a bottom, and sidewalls having lower ends in engagement with the bottom and comprising at least one about 90° bend; one or more feeding medium dispensaries affixed within the receptacle interior; a cover member positioned over the open top, that covers the receptacle and labyrinthine passages; and one or more feeding medium vessels that interfaces with the cover member and permits fluid communication between feeding medium contained within the feeding medium vessel and the feeding medium dispensary within the base unit.

Another embodiment described herein is a bee feeding medium. The bee feeding medium can be multiple forms depending on whether bees are provided the medium directly in the feeding medium dispensary or the feeding medium is supplied in a feeding medium vessel. For direct feeding, the feeding medium can be solid or liquid. For feeding using a feeding medium vessel, the feeding medium is typically a liquid, fluid, emulsion, or flowable gel. In some aspects, the feeding medium comprises an aqueous liquid.

The bee feeding medium can comprise water, honey, sugar, high fructose corn syrup, bee candy, nectar, pollen, pollen patties, grease patties, bee bread, propolis, bees wax, protein supplements, or combinations thereof. In some aspects, the feeding medium comprises one or more solvents. Such solvents comprise water, ethanol, a water ethanol mixture, 3-methoxy-3-methyl-1-butanol, polyethylene glycols (molecular weights: 100-600), glycerol, propylene glycol, polyvinylpyrrolidone, propylene carbonate, or combinations thereof.

In another embodiment, the bee feeding medium comprises one or more preservatives comprising ethanol, isopropanol, methanol, butyl alcohol, other 02-06 alcohols, benzalkonium chloride, benzalkonium chloride solution, benzethonium chloride, benzoic acid, benzyl alcohol, butylparaben, cetylpyridinium chloride, chlorobutanol, chlorocresol, cresol, dehydroacetic acid, ethylparaben, methylparaben, methylparaben sodium, phenol, phenylethyl alcohol, phenylmercuric acetate, phenylmercuric nitrate, potassium benzoate, potassium sorbate, propylparaben, propylparaben sodium, sodium benzoate, sodium dehydroacetate, sodium propionate, sorbic acid, thimerosal, thymol, or combinations thereof.

In another embodiment, the bee feeding medium comprises one or more miticides comprising Neem extracts, oxalic acid, formic acid, lactic acid, thymol, spores of entomopathogenic fungi pathogenic to mites, hyphae of entomopathogenic fungi pathogenic to mites, preconidial mycelium of entomopathogenic fungi pathogenic to mites, extracts of preconidial mycelium of entomopathogenic fungi pathogenic to mites, or combinations thereof.

In another embodiment, the bee feeding medium comprises one or more viscosity modifiers. Suitable and nonlimiting viscosity modifiers that may be present in the matrices described herein comprise methylcellulose, ethylcellulose, hydroxypropylmethyl cellulose, hydroxypropyl cellulose, hydroxyethyl cellulose, hydroxymethyl cellulose, polymethylmethacrylate, polyhydroxyethylmethacrylate, polyvinylpyrrolidone, copovidone, polyvinyl alcohol, a copolymer of polyvinylpyrrolidone and polyvinyl acetate, or combinations thereof.

In another embodiment, the bee feeding medium may optionally comprise one or more antioxidants. Suitable antioxidants comprise tocopherols (e.g., alpha-tocopherol, beta-tocopherol, gamma-tocopherol, or delta-tocopherol), butylated hydroxytoluene (BHT), butylated hydroxyanisole (BHA), citric acid, ascorbic acid, phenolic diterpenes (e.g., carnosic acid, carnosol, rosmanol, epirosmanol, isorosmanol, or methyl carnosate), rosmarinic acid, eugenol, eugenyl acetate, clove bud extract, methanolic extract, tea catechins (e.g., epigallocatechin gallate, epicatechin gallate, epigallocatechin, or epicatechin), or combinations thereof.

In another embodiment, the bee feeding medium may comprise one or more lipid or lipophilic vehicles, such as olive oil, soybean oil, sunflower oil, canola oil, palmitoleic acid, oleic acid, myristoleic acid, linoleic acid, arachidonic acid, vegetable oil, corn oil, sun flower oil, coconut oil, cocoa oil, peanut oil, almond oil, cottonseed oil, persic oil, sesame oil, squalane oil, castor oil, fish oil, paraffin oil, or mineral oil.

In another embodiment, the bee feeding medium may comprise one or more non-ionic surfactant, an anionic surfactant, a zwitterionic surfactant, a cationic surfactant, or a combination thereof.

In another embodiment, the bee feeding medium may comprise higher aliphatic alcohols; higher aliphatic acids; long chain fatty acids; saturated or unsaturated fatty acids; hydrogenated fatty acids; fatty acid glycerides; polyoxyethylated oleic glycerides; monoglycerides and diglycerides; mono-, bi- or tri-substituted glycerides; glycerol; glyceryl palmitostearate; glyceryl behenate; diethyleneglycol palmitostearate; polyethyleneglycol stearate; polyoxyethyleneglycol palmitostearate; glyceryl mono palmitostearate; cetyl palmitate; polyethyleneglycol palmitostearate; dimethylpolysiloxane; mono- or di-glyceryl behenate; fatty alcohols associated with polyethoxylate fatty alcohols; cetyl alcohol; octyl dodecanol; myristyl alcohol; isopropyl myristate, isopropyl palmitate, stearic acid, stearyl alcohol, and others known in the art.

In another embodiment, the bee feeding medium comprises about 0.05%, about 0.1%, about 0.5%, about 1%, about 2%, about 5%, or about 10% by volume of one or more aqueous ethanolic extracts of the mycelium of *Ganoderma lucidum Ganoderma resinaceum, Fomes fomentarius, Trametes versicolor, Fomitopsis officinalis, Ganoderma applanatum*, or combinations thereof. In one aspect, the bee feeding medium comprises about 1% by volume of one or more aqueous ethanolic extracts of the mycelium of *Ganoderma lucidum Ganoderma resinaceum, Fomes fomentarius, Trametes versicolor, Fomitopsis officinalis, Ganoderma applanatum, Inonotus obliquus*, or combinations thereof.

Many forms of extracts can be used in the bee feeding stations. Sugar water, honey, or ingestibles can be enhanced with health enhancing extracts of plants, pollen patties, mushrooms, lichens, or any other substance having phagostimulating or attractive properties to bees. Particularly, mushroom fruit body and mycelial extracts having immune enhancing or antiviral properties including but are not limited to Ascomycetes (ex. *Graphostroma platystoma, Auricularia auricula*) and Basidiomycota including but not limited to Agaricales (ex. *Chondrostereum purpureum, Psilocybe cyanescens*) and the Agaricomycetes, such as the Polyporales. In another embodiment, the bee feeding medium comprises about 0.05%, about 0.1%, about 0.5%, about 1%, about 2%, about 5%, or about 10% by volume of one or more extracts of the mycelium of one or more of: *Abortiporus biennis, Albatrellus* (genus), *Albatrellus caeruleoporus, Albatrellus confluens, Albatrellus cristatus, Albatrellus ovinus, Albatrellus pes-caprae, Bjerkandera adusta, Bondarzewia berkeleyi, Cerrena unicolor, Coltricia cinnamomea, Coltricia montagnei, Coriolopsis gallica, Cryptoporus volvatus, Daedalea quercina, Daedaleopsis confragosa, Fistulina radicata, Fomes fomentarius, Fomitopsis cajanderi, Fomitopsis officinalis, Fomitopsis pinicola, Fomitopsis rosea, Fomitopsis spraguei, Ganoderma applanatum, Ganoderma lingzhi, Ganoderma lucidum, Ganoderma sichuanense, Ganoderma tsugae, Gloeophyllum odoratum, Gloeophyllum sepiarium, Gloeoporus dichrous, Grifola frondosa, Hapalopilus nidulans, Heterobasidion annosum, Inonotus dryadeus, Inonotus obliquus, Inonotus quercustris, Inonotus radiatus, Irpex lacteus, Ischnoderma resinosum, Laetiporus cincinnatus, Laetiporus sulphureus, Lenzites betulina, Meripilus sumstinei, Neofavolus alveolaris, Nigroporus vinosus, Perenniporia fraxinophila, Perenniporia ohiensis, Perenniporia robiniophila, Phaeolus schweinitzii, Phellinus everhartii, Phellinus gilvus, Phellinus robiniae, Phellinus tremulae, Phlebia incarnata, Piptoporus betulinus, Polyporus arcularius, Polyporus badius, Polyporus brumalis, Polyorus elegans, Polyporus radicatus, Polyporus squamosus, Polyporus umbellatus, Polyporus varius, Porio cocos, Porodaedalea pini, Poronidulus conchifer, Pseudofistulina radicata, Pycnoporellus alboluteus, Pycnoporellus fulgens, Pycnoporus cinnabarinus, Schizophyllum commune, Sparassis crispa, Sparassis radicata, Spongipellis pachyodon, Spongipellis unicolor, Sparassis spathulata, Trametes elegans, Trametes hirsuta, Trametes pubescens, Trametes versicolor, Trametes villosa, Trichaptum abietinum, Trichaptum biforme, Trichaptum sector, Tyromyces chioneus, Tyromyces fumidiceps, Wolfiporia extensa*, or combinations thereof.

In another embodiment, the bee feeding medium further comprises about 0.05%, about 0.1%, about 0.5%, about 1%, about 2%, about 5%, or about 10% by volume of one or more mycelium extracts from *Antrodia cinnomonea, Ganoderma atrum, Ganoderma brownii, Ganoderma curtisii, Ganoderma lingzhi, Ganoderma oregonense, Ganoderma tsugae, Fomitopsis officinalis (Laricifomes officinalis), Fomitiporia robusta, Heterobasidion annosum, Inonotus obliquus, Inonotus hispidus, Inonotus andersonii, Inonotus dryadeus, Laetiporus cincinnatus, Laetiporus sulphureus, Laetiporus conifericola, Lenzites betulina, Phellinus igniarius, Phellinus linteus, Phellinus pini, Piptoporus betulinus, Polyporus elegans, Stereum complicatum, Stereum hirsutum, Stereum ostrea, Trametes elegans, Trametes gibbosa, Trametes hirsuta, Trametes villosa, Trametes cingulata, Trametes ochracea, Trametes pubescens, Trametes ectypa, Trametes aesculi, Wolfiporia cocos, Agaricus augustus, Agaricus blazei, Agaricus bonardii, Agaricus brasiliensis, Agaricus campestris, Agaricus lilaceps, Agaricus subrufescens, Agaricus sylvicola, Agrocybe pediades, Agrocybe aegerita, Agrocybe arvalis, Agrocybe praecox, Clitocybe odora, Conocybe cyanopus, Conocybe lacteus, Conocybe rickenii, Conocybe smithii, Conocybe tenera, Coprinopsis nivea, Coprinopsis lagopus, Coprinus comatus, Coprinus micaceus, Gymnopus hydrophilus, Gymnopus peronatus, Hypholoma aurantiaca (Leratiomyces ceres), Hypholoma cap-* noides, *Hypholoma sublateritium*, *Hypsizygus marmoreus*, *Hypsizygus tessulatus*, *Hypsizygus ulmarius*, *Lentinus ponderosus*, *Lepiota procera* (*Macrolepiota procera*), *Lepiota rachodes* (*Chlorophyllum rachodes*), *Lepista nuda*, *Mycena alcalina*, *Mycena pura*, *Mycena aurantiadisca*, *Panellus serotinus*, *Panaeolus foenisecii*, *Panaeolus subbalteatus*, *Pleurotus columbinus*, *Pleurotus ostreatus*, *Pleurotus cystidiosus*, *Pleurotus pulmonarius*, *Pleurotus sapidus*, *Pleurotus tuberregium*, *Panellus stipticus*, *Panellus serotinus*, *Pluteus cervinus*, *Psathyrella aquatica*, *Psathyrella condolleana*, *Psathyrella hydrophila*, *Psilocybe allenii*, *Psilocybe azurescens*, *Psilocybe caerulescens*, *Psilocybe coprophila*, *Psilocybe cubensis*, *Psilocybe cyanescens*, *Psilocybe ovoideocystidiata*, *Psilocybe stuntzii*, *Psilocybe subaeruginosa*, *Stropharia aeruginosa*, *Stropharia cyanea*, *Stropharia rugoso-annulata*, *Stropharia semiglobata*, *Stropharia semigloboides*, *Stropharia squamosa*, *Stropharia thrausta*, *Stropharia umbonotescens*, *Termitomyces robusta*, *Volvaria bombycina*, *Volvariella volvacea*, or combinations thereof.

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All of the various embodiments, aspects, and options disclosed herein can be combined in any and all variations or iterations. The scope of the compositions, formulations, methods, and processes described herein include all actual or potential combinations of embodiments, aspects, options, examples, and preferences herein described. The exemplary compositions and formulations described herein may omit any component, substitute any component disclosed herein, or include any component disclosed elsewhere herein. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. Furthermore, the foregoing discussion discloses and describes merely exemplary embodiments. All patents and publications cited herein are incorporated by reference herein for the specific teachings thereof.

EXAMPLES

Example 1

An LBF as described herein serves to help save wild and domestic bees and will allow ordinary people—"citizen scientists"—to help save the bees by feeding wild bees in their yards and gardens. Bee colonies typically have one entrance that the bees guard to prevent invaders such as yellow jackets or wasps. Wasps and yellow jackets are physically stronger than bees, one on one, but bees have advantages in numbers. Bees are capable of traversing circuitous or labyrinthine passages within their colonies. In contrast, yellow jackets, wasps, and hornets are reluctant to traverse such circuitous passages.

An experiment was conducted by hanging an LBF containing a feeding solution from a tree in a garden in Cortes Island, British Columbia, Canada during an August afternoon. The feeding station had an entry portal and two labyrinthine passages, each with five 90° bends required to reach the inner atrium containing the feeding solution. See FIG. 1. The feeding medium contained mushroom mycelium-based extracts, flavored with peppermint, placed upon honey. After two days, bees were observed entering and exiting the feeding station. Upon removing the cover, at least 5 bees had traversed around five 90° bends of the labyrinthine passages to reach the innermost atrium and the feeding solution.

Example 2

When the LBF was actively observed in a garden in Cortes Island, British Columbia, Canada on an August afternoon, 7 bees entered and exited the feeding station in 48 seconds. This indicates that thousands of bees were potentially capable of visiting the bee station during one day. Upon opening up the feeding station, 5 bees were observed in the innermost atrium. Although several yellow jackets entered the station, they remained in the entrance vestibule and did not traverse the four additional 90° bends of the labyrinthine passages to the center. This demonstrates the selective advantage of this feeding apparatus in excluding unwanted insects such as yellow jackets, wasps, or hornets.

Example 3

Figure 4A:
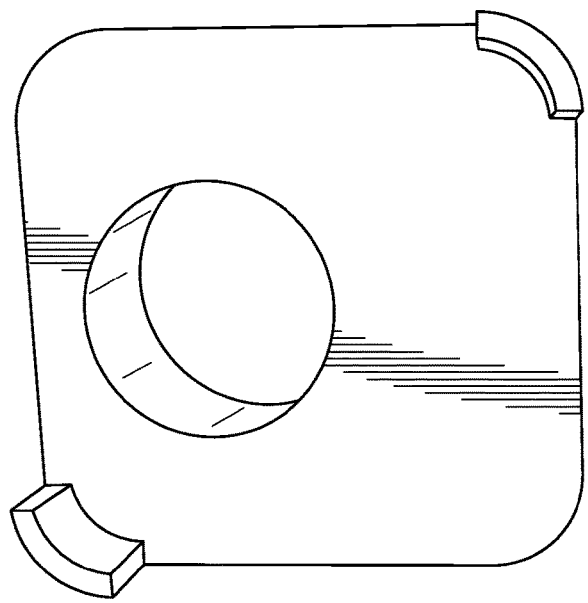
FIG. 4A shows an exemplary internal view of a feeding cover (left) and base (right).
Figure 4C:
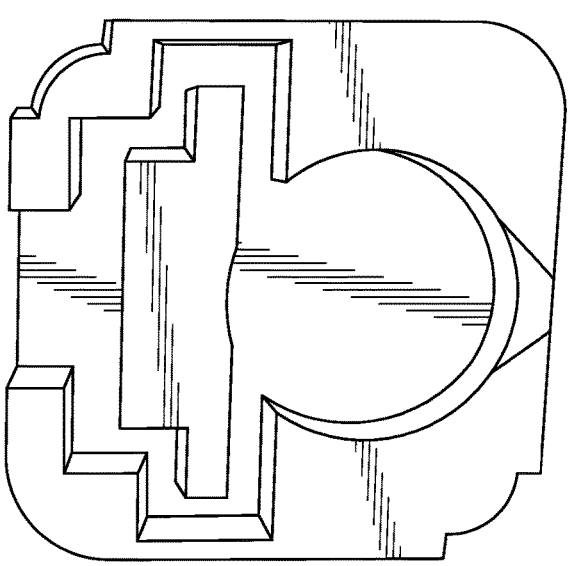
FIG. 4B shows the external view of the same cover.
Figure 4B:
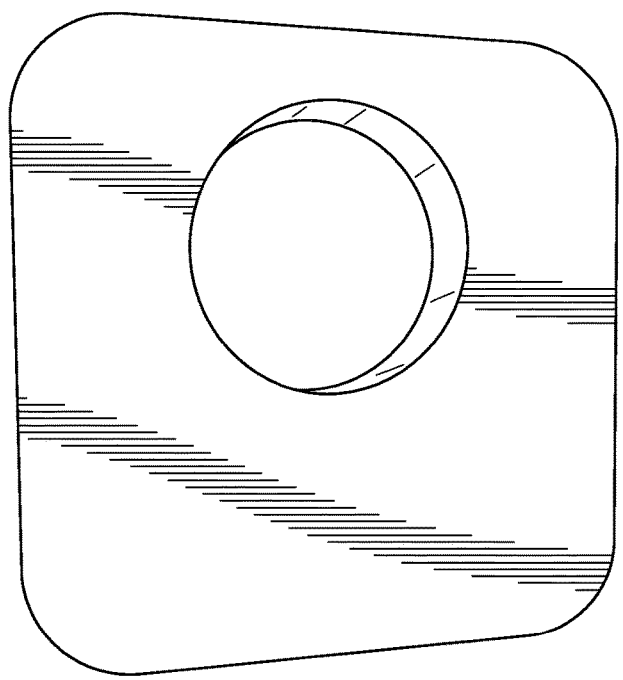
Figure 5:
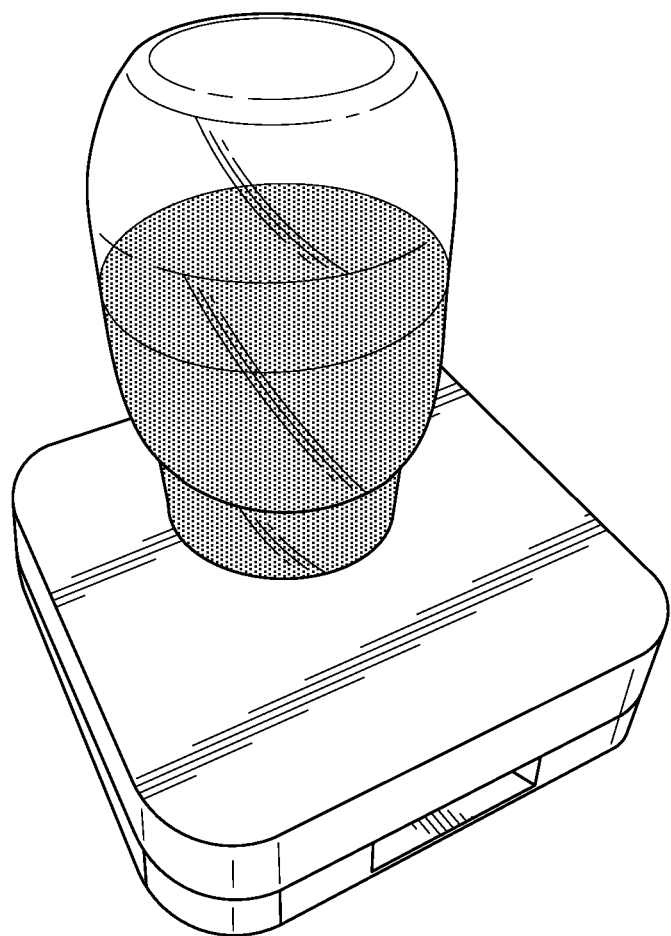
FIG. 5 shows an exemplary LBF prototype fully assembled with a Mason jar as a feeding medium reservoir and filled with a feeding solution.

An exemplary prototypical LBF is shown in FIG. 4 and FIG. 5.

Example 4

Exemplary LBFs and accessories are shown in FIG. 6-9.

The invention claimed is:
1. A labyrinthine bee feeding apparatus comprising:
 a housing comprising:
  at least one entrance connected to one or more passageways each having at least one bend, wherein each of the at least one bend is configured to allow passage of a bee therethrough and to inhibit passage of a yellow jacket, wasp, or hornet; and
  at least one feed dispensing area within the housing, located at a terminus of each of the one or more passageways; and
 a one-way port leading from the at least one feed dispensing area to exterior of the housing;
  wherein the one-way port is configured to allow a bee to exit the at least one feed dispensing area and housing and to inhibit reentry of the bee and/or to prevent entry of a yellow jacket, wasp, or hornet; and
  wherein the apparatus is configured to receive and secure a removable feeding vessel in fluid communication with the at least one feed dispensing area.
2. The apparatus of claim 1, wherein the apparatus further comprises:
 a cover member positioned over the housing that is configured to receive and secure the removable feeding vessel and fluidly communicate with the at least one feeding dispensing area.
3. The apparatus of claim 2, wherein the housing and/or cover member further comprise:
 one or more communication devices comprising:
  wireless internet receivers/transmitters;
 one or more monitoring and/or attracting devices selected from:
  internal or external video cameras, electric eye counter mechanisms,
pollen sensors,
internal or external light sources,
sonic emitting devices,
fragrance emitting devices, or
combinations thereof; and
one or more power sources selected from:
batteries,
rechargeable batteries, or
solar panels;
wherein the one or more power sources is configured to provide power to the one or more communication devices and the one or more monitoring and/or attracting devices.

4. The apparatus of claim 2, further comprising:
a removable feeding vessel which contains a bee feeding medium.

5. The apparatus of claim 4, wherein the bee feeding medium comprises: water, honey, sugar, high fructose corn syrup, bee candy, nectar, pollen, pollen patties, grease patties, bee bread, propolis, bees wax, protein supplements, or combinations thereof.

6. The apparatus of claim 4, wherein the bee feeding medium comprises one or more mushroom mycelium extracts.

7. The apparatus of claim 4, wherein the bee feeding medium is configured to:
benefit bees by treating infections of or reducing the susceptibility to viruses, fungal pathogens, bacterial pathogens, beetles, or mites;
reduce viral transmission from bees to plants;
increase the ability of bees to spread pollen;
increase the flight time of bees;
increase the immunity of bees;
increase the brood rearing of bees;
increase the ability of bees to reproduce;
increase the ability of bees to detoxify harmful anthropogenic substances; or
a combination thereof.

8. The apparatus of claim 4, wherein the bee feeding medium comprises:
one or more mushroom mycelium extracts;
one or more of water, honey, sugar, high fructose corn syrup, bee candy, nectar, pollen, pollen patties, grease patties, bee bread, propolis, bees wax, protein supplements, or combinations thereof; and
one or more preservatives.

9. The apparatus of claim 8, wherein the one or more mushroom mycelium extracts comprises about 1% or less by volume of one or more aqueous ethanolic extracts of the mycelium of *Ganoderma lucidum, Ganoderma resinaceum, Fomes fomentarius, Trametes versicolor, Fomitopsis officinalis, Ganoderma applanatum, Inonotus obliquus*, or combinations thereof.

10. The apparatus of claim 1, wherein each of the one or more passageways comprises at least one about 10° to about 90° bend.

11. The apparatus of claim 1, wherein each of the one or more passageways comprises: at least one about 30° to about 90° bend, at least one about 45° to about 90° bend, at least one about 60° to about 90° bend, at least one about 80° to about 90° bend, or at least one about 90° bend.

12. The apparatus of claim 1, wherein each of the one or more passageways comprises at least one about 90° bend.

13. The apparatus of claim 1, wherein each of the one or more passageways comprises 1, 2, 3, 4, 5, or 6 about 90° bends.

14. The apparatus of claim 1, wherein each of the one or more passageways comprises 5 about 90° bends.

15. A labyrinthine bee feeding apparatus comprising:
a housing comprising:
at least one entrance connected to one or more passageways each having at least one bend, wherein each of the at least one bend is configured to allow passage of a bee therethrough and to inhibit passage of a yellow jacket, wasp, or hornet; and
at least one feed dispensing area within the housing, located at a terminus of each of the one or more passageways;
a one-way port leading from the at least one feed dispensing area to an exterior of the housing that is configured to allow a bee to exit the at least one feed dispensing area and to inhibit reentry of the bee and/or to prevent entry of a yellow jacket, wasp, or hornet; and
a cover member positioned over the housing that is configured to receive and secure a removable feeding vessel in fluid communication with the at least one feed dispensing area;
wherein the housing and/or cover member further comprise:
one or more communication devices comprising:
wireless internet receivers/transmitters;
one or more monitoring and/or attracting devices selected from:
internal or external video cameras,
electric eye counter mechanisms,
pollen sensors,
internal or external light sources,
sonic emitting devices,
fragrance emitting devices, or
combinations thereof;
wherein the monitoring devices are configured to monitor the number of bee visits to the bee feeding apparatus; and
one or more power sources selected from:
batteries,
rechargeable batteries, or
solar panels;
wherein the one or more power sources is configured to provide power to the one or more communication devices and the one or more monitoring and/or attracting devices.

16. A method for monitoring bee visits to the labyrinthine bee feeding apparatus (LBF) of claim 15, comprising:
counting bee visits to the LBF utilizing the one or more monitoring devices; and
transmitting the bee visit data via the one or more communication devices.

* * * * *